United States Patent
Ephremidze et al.

(10) Patent No.: US 10,951,919 B2
(45) Date of Patent: Mar. 16, 2021

(54) MULTIVARIABLE MATRIX SPECTRAL FACTORIZATION

(71) Applicant: IN ABU DHABI CORPORATION, Abu Dhabi, AE (US)

(72) Inventors: Lasha Ephremidze, Abu Dhabi (AE); Ilya Spitkovsky, Abu Dhabi (AE)

(73) Assignee: New York University in Abu Dhabi Corporation, Abu Dhabi (AE)

( * ) Notice: Subject to any disclaimer, the term of this patent is extended or adjusted under 35 U.S.C. 154(b) by 0 days.

(21) Appl. No.: 16/557,944

(22) Filed: Aug. 30, 2019

(65) Prior Publication Data

US 2020/0077118 A1 Mar. 5, 2020

Related U.S. Application Data

(60) Provisional application No. 62/725,700, filed on Aug. 31, 2018, provisional application No. 62/726,868, filed on Sep. 4, 2018.

(51) Int. Cl.
*H04N 19/635* (2014.01)
*H04B 1/10* (2006.01)
*G06F 17/16* (2006.01)
*H04N 19/65* (2014.01)
*G06F 17/14* (2006.01)

(52) U.S. Cl.
CPC ............ *H04N 19/635* (2014.11); *G06F 17/16* (2013.01); *H04B 1/10* (2013.01); *H04N 19/65* (2014.11); *G06F 17/148* (2013.01)

(58) Field of Classification Search
CPC ......... G06F 17/148; G06F 17/16; H04B 1/10; H04N 19/635; H04N 19/65

USPC .................................................... 375/240.19
See application file for complete search history.

(56) References Cited

U.S. PATENT DOCUMENTS

| 9,318,232 B2 * | 4/2016 | Ephremides ............ G06F 17/16 |
| 2013/0251340 A1 * | 9/2013 | Jiang ................... G06K 9/4676 386/244 |

OTHER PUBLICATIONS

Avelli, D.N., et al., "Algorithms for multidimensional spectral factorization and sum of squares", Linear Algebra and its Applications, 2008, 429(5-6):1114-1134.

Basu, S., "A Constructive Algorithm for 2-D Spectral Factorization with Rational Spectral Factors", IEEE Transactions on Circuits and Systems I: Fundamental Theory and Applications, Sep. 2000, 47(9):1309-1318.

Boettcher, A., et al., "A Newton method for canonical Wiener-Hopf and spectral factorization of matrix polynomials", Electronic Journal of Linear Algebra, 2013, 26:873-897.

Bose, N. K., et al., "2-D Wilson Spectral Factorization", IEEE Transactions on Acoustics, Speech, and Signal Processing, Jan. 1988, 36(1):125-128.

(Continued)

*Primary Examiner* — Jamie J Atala
*Assistant Examiner* — Kathleen V Nguyen
(74) *Attorney, Agent, or Firm* — Foley & Lardner LLP (57) ABSTRACT

A method for performing Multivariable Matrix Spectral Factorization has been developed, which allows factorization in real time high-dimensional matrices with multivariable high-order polynomial or non-rational entries. Systems implementing the method provide improved performance and capabilities in applications reducible to multivariable matrix spectral factorization.

20 Claims, 4 Drawing Sheets

(56) References Cited

OTHER PUBLICATIONS

Coudray, N., et al., "Classification and mutation prediction from non—small cell lung cancer histopathology images using deep learning", Nature Medicine, Oct. 2018, 24:1559-1567.

Dhamala, M., et al., "Analyzing Information Flow in Brain Networks with Nonparametric Granger Causality", NeuroImage, Jun. 2008, 41(2):354-362.

Ephremidze, L., et al., "A Simple Proof of the Matrix-Valued Fejer-Riesz Theorem", Journal of Fourier Analysis and Applications, 2009, 15(1):124-127.

Ephremidze, L., et al., "On the Algorithmization of Janashia-Lagvilava Matrix Spectral Factorization Method", IEEE Transactions on Information Theory, Feb. 2018, 64(2):728-737.

Geronimo, J.S., et al., "Factorization of multivariate positive Laurent polynomials", Journal of Approximation Theory, 2006, 139(1-2):327-345.

Geronimo, J.S., et al., "Positive extensions, Fejer-Riesz factorization and autoregressive filters in two variables", Annals of Mathematics, 2004, 160(3):839-906.

Helson, H., et al., "Prediction Theory and Fourier Series in Several Variables", Acta Mathematica, 1958, 99(1):165-202.

Jafarian, a., et al., "A Novel Method for Multichannel Spectral Factorization", Proceedings of the 20th European Signal Processing Conference, Aug. 27-31, 2012, pp. 1069-1073.

Janashia, G., et al., "A method of approximate factorization of positive definite matrix functions", Studia Mathematica, 1999, 137(1):93-100.

Janashia, G., et al., "A New Method of Matrix Spectral Factorization", IEEE Transactions on Information Theory, Apr. 2011, 57(4):2318-2326.

Kucera, V., "Factorization of Rational Spectral Matrices: a Survey of Methods", International Conference on Control, 1991, pp. 1074-1078.

Kummert, a., "Spectral Factorization of Two-Variable Para-Hermitian Polynomial Matrices", Multidimensional Systems and Signal Processing, 1990, 1(3):327-339.

Murray, J.J., "Matrix Two-Dimensional Spectral Factorization," IEEE Transactions on Circuits and Systems II: Analog and Digital Signal Processing, Aug. 1993, 40(8):509-511.

Sayed, a.H., et al., "A survey of spectral factorization methods", Numerical Linear Algebra with Applications, 2001, 8(6-7):467-496.

Szegedy, C., et al., "Rethinking the Inception Architecture for Computer Vision", IEEE Conference on Computer Vision and Pattern Recognition, 2016, pp. 2818-2826.

Wiener, N., et al., "The Prediction Theory of Multivariate Stochastic Processes: I. The Regularity Condition", Acta Mathematica, 1957, 98(1-4):111-150.

Wiener, N., et al., "The Prediction Theory of Multivariate Stochastic Processes: II. The Linear Predictor", Acta Mathematica, 1958, 99(1):93-137.

\* cited by examiner

MULTIVARIABLE MATRIX SPECTRAL FACTORIZATION

CROSS-REFERENCE TO RELATED APPLICATIONS

This application claims benefit of priority to U.S. Provisional Application Nos. 62/725,700 filed Aug. 31, 2018 and 62/726,868 filed Sep. 4, 2018, both of which are incorporated herein by reference in their entirety.

TECHNICAL FIELD

The present disclosure relates generally to methods for spectral factorization, specifically to multivariable matrix spectral factorization.

BACKGROUND

The spectral factorization problem was originally formulated in the scalar case by Wiener and independently Kolmogorov in connection with linear prediction theory of stationary stochastic processes. Wiener used the matrix generalization of the problem in the study of multidimensional stationary time series. In parallel, Helson and Lowdenslager introduced multivariable matrix spectral factorization in the prediction theory of vector valued stationary sequences indexed with multiple parameters. Since then spectral factorization has become an important tool in solving numerous applied problems in Control and Communication Engineering. In particular, it is used for wireless and underwater communications, radar systems, data compression, and virtually any problem with randomized models.

Since Wiener's original effort to create an efficient computable method of matrix spectral factorization (1-D MSF), dozens of papers addressed the development of appropriate algorithms.

A new effective method of matrix spectral factorization (1-D MSF) has been proposed. This method has been awarded U.S. Pat. No. 9,318,232 B2. However, the patented 1-D MSF method does not contain a generalization to the multivariate case (n-D MSF). Matrix Spectral Factorization (1-D MSF) is used to process multidimensional data indexed with 1 parameter (e.g., vector valued time series), while a Multivariable Matrix Spectral Factorization (n-D MSF) would process multidimensional data indexed with n parameters (e.g., color 2-D images, or 3-D tomographic images).

SUMMARY

Embodiments described herein relate generally to multivariable matrix spectral factorization It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a Multivariable Matrix Spectral Factorization with applications including, but not limited to, n-Dimensional Filtering, Image and Video Compression, and Radar Systems. A new multivariate matrix spectral factorization (n-D MSF) method has been developed which has low computational complexity and can be implemented in real time. It can be used to factorize non-rational matrices as well. The proposed method is non-trivial and non-obvious generalization of the matrix spectral factorization (1-D MSF) method described in the Background section. Multivariable Matrix Spectral Factorization (n-D MSF) is used to process multidimensional data indexed with n parameters (e.g., color 2-D images, or 3-D tomographic images), while 1-D MSF deals with data indexed with a single parameter. The n-D MSF provides a mechanism for overcoming computational limitations with current hardware in order to solve complicated problems integral to various special purpose applications as mentioned above. The lack of efficient methods for such calculations has been considered to be a major bottleneck that makes many theoretical developments in multidimensional signals and systems infeasible.

While the new n-D MSF method shares some general characteristic features of 1-D MSF method, it presents a solution to a long felt problem with prior factorization methods. The n-D MSF performs the spectral factorization of a multivariable matrix-function by step-by-step factorizing the left-upper submatrices of lower dimension. The accuracy of the result can be controlled at each step, which is crucial for the efficiency of the method. Specifically, the method comprises the following steps:

1. A lower-upper triangular factorization of the given multivariable matrix-function is performed along with corresponding scalar spectral factorizations on the main diagonal.
2. At each step mentioned above, a unitary multivariable matrix-function is found which converts a corresponding left-upper submatrix into the spectral factor by multiplication from the right. The special properties of this unitary multivariate matrix-function, the method for identifying it, and its role in the factorization process constitute the main ideas of the algorithm. This approach eliminates the technical difficulties of the problem that inhibited its efficient implementation until now.
3. The class of above mentioned unitary multivariable matrix functions plays important role in the theory of multivariable wavelets and multirate filter banks which can become an additional source of practical applications.

A substantial difference from 1-D case is that n-D MSF method uses polynomials with coefficients from the field of rational functions of several complex variables instead of usual polynomials used in 1-D MSF method. This cannot be done with the current 1-D MSF method.

Turning to the detailed mathematical description of the method, let S be a given r×r matrix function of n complex variables $z=(z_1, z_2, \ldots, z_n)$ $$S(z) = \begin{pmatrix} f_{1,1}(z) & f_{1,2}(z) & \ldots & f_{1,r}(z) \\ f_{2,1}(z) & f_{2,2}(z) & \ldots & f_{2,r}(z) \\ \vdots & \vdots & \vdots & \vdots \\ f_{r,1}(z) & f_{r,2}(z) & \ldots & f_{r,r}(z) \end{pmatrix}, z \in \mathbb{T}^n, \quad (1)$$

with integrable entries, $f_{ij} \in L_1(\mathbb{T}^n)$, having the Fourier expansion $$S(z) = \sum_{k=(k_1,k_2,\ldots,k_n) \in \mathbb{Z}^n} C_k z^k, C_k \in \mathbb{C}^{r \times r}, z^k = z_1^{k_1} z_2^{k_2} \ldots z_n^{k_n}. \quad (2)$$

If $S(z)$ is positive definite for a.e $z \in \mathbb{T}^n$ with respect to normalized Lebesgue measure $\sigma = dx/(2\pi)^n$ and satisfies the Paley-Wiener condition $\int_{\mathbb{T}^n} \log \det S \, d\sigma > -\infty$, then it admits the spectral factorization $S(z) = S^+(z)S^-(z)$, where $$S^+(z) = \sum_{k \in H} A_k z^k \text{ and } S^-(z) = \sum_{k \in H} A_k^* z^{-k}. \quad (3)$$

Here (3) has the following properties:

1. H is a so called non-symmetric half plane: $H \cup (-H) = \mathbb{Z}^n$ and $H \cap (-H) = \{0\}$ containing $\{(k_1, k_2, \ldots, k_n) \in \mathbb{Z}^n : k_1 > 0\}$;
2. $\Sigma_{k \in H} \text{tr}(A_k A_k^*) < \infty$;
3. $S^+$ is outer: $\int_{\mathbb{T}^n} \log|\det S^+| d\sigma = \log|\det A_0|$;
4. $A_0$ is positive definite.

$S^+$ with properties 1-4 is unique, and we will always assume that these conditions are satisfied.

In one embodiment, a method provides an approximate computation of coefficients $A_k$ in (3) for given coefficients $C_k$ in (2). The embodiment consists of the following procedures:

Procedure 1 (Triangular Factorization).

Performing the lower-upper triangular factorization of (1), $S(z) = M(z)(M(z))^*$, where $$M(z) = \begin{pmatrix} f_1^+(z) & 0 & \ldots & 0 & 0 \\ \varphi_{21}(z) & f_2^+(z) & \ldots & 0 & 0 \\ \vdots & \vdots & \vdots & \vdots & \vdots \\ \varphi_{r-1,1}(z) & \varphi_{r-1,2}(z) & \ldots & f_{r-1}^+(z) & 0 \\ \varphi_{r1}(z) & \varphi_{r2}(z) & \ldots & \varphi_{r,r-1}(z) & f_r^+(z) \end{pmatrix}. \quad (4)$$

In (4), $f_i^+$, $i=1, 2, \ldots r$, are scalar spectral factors of $\det S_i/\det S_{i-1}$, where $S_0=1$ and $S_i$ is the left upper i×i principle minor of S, and $\varphi_{ij} \in L_1(\mathbb{T}^n)$, $2 \leq i \leq r$, $1 \leq j < i$.

Procedure 2 (Recurrent Construction).

From m=2 until m=r step by step performing:

Step 1 (Preparing an Auxiliary Matrix).

Take the m×m matrix-function $$F_m(z) = \begin{pmatrix} 1 & 0 & 0 & \ldots & 0 & 0 \\ 0 & 1 & 0 & \ldots & 0 & 0 \\ 0 & 0 & 1 & \ldots & 0 & 0 \\ \vdots & \vdots & \vdots & \vdots & \vdots & \vdots \\ 0 & 0 & 0 & \ldots & 1 & 0 \\ \xi_1(z) & \xi_2(z) & \xi_3(z) & \ldots & \xi_{m-1}(z) & f_m^+(z) \end{pmatrix}, \quad (5)$$

where $\xi_1(z), \xi_2(z), \ldots, \xi_m(z), f_m^+(z)$ are the first m entries of the mth row of the matrix $M_{m-1}(z)$. It is assumed that $M_1(z)=M(z)$ (see (4)) and $M_m(z)$ is obtained during the mth iteration, m=2, 3, \ldots, r.

Step 2 (Expanding the Coefficients).

Introduce the field $\mathbb{F} = \mathbb{F}_{n-1}$ of rational functions of n−1 complex variables:

$\mathbb{F} = \mathbb{F}_n = \{P/Q: P,Q \in \mathbb{C}[z_2, z_3, \ldots, z_n]\}$.

Step 3 (Cutting the Tails).

Represent the functions $f_m^+$ and $\xi_i$, i=1, 2, \ldots, m−1, in (5) as polynomials in variable $t:=z_1$ with coefficients from $L_2(\mathbb{T}^{n-1})$:

$$f(t, z_2, \ldots, z_n) = \sum_{j=0}^{\infty} d_j(z_2, z_3, \ldots, z_n) t^j \text{ and} \quad (6)$$

$$\xi_i(t, z_2, \ldots, z_n) = \sum_{j=-\infty}^{\infty} \gamma_{ij}(z_2, z_3, \ldots, z_n) t^j$$

and approximate functions in (6) by (Laurent) polynomials with coefficients from $\mathbb{F}$:

$$f_m^+ \approx \hat{f}_m^+ = \sum_{k=0}^{N} \hat{a}_k t^k \text{ and} \quad (7)$$

$$\xi_i \approx \hat{\xi}_i = \sum_{k=-N}^{N} \hat{\gamma}_{ik} t^{-k}, \hat{a}_k, \hat{\gamma}_{ik} \in \mathbb{F},$$

for some large integer N. Let $\hat{F}_m$ be the matrix (5) with $f_m^+$ and $\xi_i$ replaced by $\hat{f}_m^+$ and $\hat{\xi}_i$, respectively.

Step 4 (Construction of Multivariable Wavelet Matrix).
Find a unitary matrix-function $U_m$ of the form $$U_m = \begin{pmatrix} u_{11} & u_{12} & \cdots & u_{1m} \\ u_{21} & u_{22} & \cdots & u_{2m} \\ \vdots & \vdots & \vdots & \vdots \\ u_{m-1,1} & u_{m-1,2} & \cdots & u_{m-1,m} \\ \overline{u_{m1}} & \overline{u_{m2}} & \cdots & \overline{u_{mm}} \end{pmatrix}, \quad (8)$$

where $$u_{ij} = \sum_{k=0}^{N} a_k^{(ij)} t^k, a_k^{(ij)} \in \mathbb{F}, \overline{u_{ij}} = \sum_{k=0}^{N} \overline{a_k^{(ij)}} t^{-k} \quad (9)$$

such that det $U_m = 1$, and $\hat{F}_m \cdot U_m$ is a matrix polynomial in variable t.

The entries of (8) can be determined by considering the following system of equations (over the field $\mathbb{F}$) in block matrix form $$\mathbb{S}_j := \begin{cases} \Gamma_1 \cdot X_m - D \cdot \overline{X_1} = 0, \\ \Gamma_2 \cdot X_m - D \cdot \overline{X_2} = 0, \\ \vdots \\ \Gamma_j \cdot X_m - D \cdot \overline{X_j} = 1. \\ \vdots \\ \Gamma_{m-1} \cdot X_m - D \cdot \overline{X_{m-1}} = 0. \\ \Gamma_1 \cdot X_1 + \Gamma_2 \cdot X_2 + \ldots + \Gamma_{m-1} \cdot X_{m-1} + D \cdot \overline{X_m} = 0. \end{cases} \quad (10)$$

where (see (7))

$$D = \begin{pmatrix} \hat{a}_0 & \hat{a}_1 & \hat{a}_2 & \cdots & \hat{a}_{N-1} & \hat{a}_N \\ 0 & \hat{a}_0 & \hat{a}_1 & \cdots & \hat{a}_{N-2} & \hat{a}_{N-1} \\ 0 & 0 & \hat{a}_0 & \cdots & \hat{a}_{N-3} & \hat{a}_{N-2} \\ \cdot & \cdot & \cdot & \cdots & \cdot & \cdot \\ 0 & 0 & 0 & \cdots & 0 & \hat{a}_0 \end{pmatrix},$$

$$\Gamma_i = \begin{pmatrix} \hat{\gamma}_{i0} & \hat{\gamma}_{i1} & \hat{\gamma}_{i2} & \cdots & \hat{\gamma}_{i,N-1} & \hat{\gamma}_{iN} \\ \hat{\gamma}_{i1} & \hat{\gamma}_{i2} & \hat{\gamma}_{i3} & \cdots & \hat{\gamma}_{iN} & 0 \\ \hat{\gamma}_{i2} & \hat{\gamma}_{i3} & \hat{\gamma}_{i4} & \cdots & 0 & 0 \\ \cdot & \cdot & \cdot & \cdots & \cdot & \cdot \\ \hat{\gamma}_{iN} & 0 & 0 & \cdots & 0 & 0 \end{pmatrix},$$

$0 = (0, 0, \ldots, 0)^T \in \mathbb{F}^{N+1}$, and $1 = (1, 0, 0, \ldots, 0)^T \in \mathbb{F}^{N+1}$, and the column vectors $$X_i = (a_{i0}, a_{i1}, \ldots, a_{iN})^T \in \mathbb{F}^{N+1}, i=1,2,\ldots,m,$$

are unknowns. Determining $X_i$, i=1, 2, ..., m−1, from the first m−1 equations of (10), $$X_i = \overline{D^{-1} \Gamma_i X_m} - \delta_{ij} \overline{D^{-1}} 1, i=1,2,\ldots,m-1. \quad (11)$$

and then substituting them in the last equation of (10), the latter reduces to $$(\Theta_1 \Theta_1^* + \Theta_2 \Theta_2^* + \ldots + \Theta_{m-1} \Theta_{m-1}^* + I_{N+1}) \overline{X_m} = \Theta_j \overline{D^{-1}} 1. \quad (12)$$

where $\theta_i = D^{-1} \Gamma_i$, i=1, 2, ..., m−1. For each j=1, 2, ... m, (12) is a linear algebraic system of N+1 equations with (N+1) unknowns (in the field $\mathbb{F}$). Its coefficient matrix is always non-singular. Thus (12) has a unique solution. Finding $\overline{X_m}$ from (12) and then determining $X_1, X_2, \ldots X_{m-1}$ from (11), we obtain the unique solution $(X_1^j, X_2^j, \ldots, X_{m-1}^j, X_m^j)$ of the system $\mathbb{S}$, where $$X_i^j := (a_{i0}^j, a_{i1}^j, \ldots, a_{iN}^j)^T, i=1,2,\ldots,m. \quad (13)$$

If we construct a matrix $$V = \begin{pmatrix} v_{11} & v_{12} & \cdots & v_{1,m-1} & v_{1m} \\ v_{21} & v_{22} & \cdots & v_{2,m-1} & v_{2m} \\ \vdots & \vdots & \vdots & \vdots & \vdots \\ v_{m-1,1} & v_{m-1,2} & \cdots & v_{m-1,m-1} & v_{m-1,m} \\ \overline{v_{m1}} & \overline{v_{m2}} & \cdots & \overline{v_{m,m-1}} & \overline{v_{mm}} \end{pmatrix},$$

by letting (see (13))

$$v_{ij} = \sum_{n=0}^{N} a_{in}^j t^n, 1 \leq i, j \leq m,$$

then $$U = V(V(1))^{-1}.$$

Step 5 (Iterative Step).
Let $$M_m = M_{m-1} \cdot \begin{pmatrix} U_m & 0 \\ 0 & I_{r-m} \end{pmatrix},$$

where $U_m$ is determined in Step 4 by (8), and $I_{r-m}$ is the identity matrix of order r−m.

As it was mentioned above, $M_m$ is used at the next iteration of the recurrent Procedure 2 at Step 1 when the number m increases by 1. Whenever m=r, it is assumed that $$M_r = M_{r-1} \cdot U_r. \quad (14)$$

The matrix-function (14) is an approximate spectral factor of (1). As N→∞ in (7), the difference between the computed and the exact spectral factors goes to zero in $L_2$ norm.

Procedure 3 (the Canonical Spectral Factor).

In order to satisfy the uniqueness condition, we have to multiply a spectral factor on the right by a constant unitary matrix U which makes the product positive definite at the origin. Thus $$S^+ = M_r \cdot U.$$

The method can be used for any dimensional multivariate matrix function for which the spectral factorization exists, including non-rational matrices. The method can be used for efficient implementation of engineering solutions to problems in n-Dimensional Filtering, Image and Video Compression, and Radar Systems, which are computationally reducible to multivariable matrix spectral factorization.

Application to Granger Causality Test

In one particular implementation, n-D MSF is utilized with the Granger causality test. Granger causality has emerged in the past years as a leading technique for inferring directions of neural interactions and information flow in the brain from corresponding electroencephalographic (EEG) and functional magnetic resonance imaging (fMRI) recordings. As it is shown in the paper of Dhamala et al "Analyzing information flow in brain networks with nonparametric Granger causality," *NeuroImage*, vol. 41, no. 2, pp. 354-362, 2008, non-parametric methods of estimation of Granger causality (GC) is reduced to MSF and the same author demonstrated that GC can be used to identify exactly epilepsy seizure onset location in brain before the surgery (see Dhamala et al "Localizing epileptic seizure onsets with Granger causality" PHYSICAL REVIEW E 88, 030701(R), 2013).

So far Wilson's algorithm of 1-D MSF is used by neuroscientists. However, in real-life problem applications, where power spectral density matrix (which have to be factorized) is usually noisy and frequently singular (which arise in biological systems with unstable modes; see Friston et al "Granger causality revisited" DOI: 10.1016/j.neuroimage.2014.06.062) above mentioned 1-D MSF algorithm outperforms Wilson's algorithm in accuracy (a publication on this topic is in progress).

As Granger causality is based on Wiener's theory of prediction of stationary stochastic processes, which can be generalized to multi-parameter stationary processes as well, a theory of multivariable Granger causality can be created and tested for the analysis of EEG and fMRI data as these recordings are 2-dimensional or even 3-dimensional by its nature. Since n-D MSF will be required for multivariable Granger causality, this perspective opens new opportunities for practical applications of novel n-D MSF method. These fields include research on neurological and psychological diseases such as Epilepsy, Schizophrenia, Sleep-wake regulatory system, Parkinson, Refractive Chronic pain, Multiple Sclerosis, Lateral Sclerosis, Alzheimer.

Application to n-D Wiener Filtering

A signal that is transmitted from a sender to a receiver is often impaired by various forms of distortions. Wiener filtering is a method to recover the original signal as accurately as possible from the received signal. The necessity of this frequently arises in signal detection, prediction, estimation, stochastic control, missile guidance, aircraft stabilization, economic forecasting, seismic data processing, etc.

If the multidimensional signal $s_i$ depends on a single parameter i, e.g. for stochastic vector time series, then Wiener filtering requires 1-D MSF. However, in applications where $S_{i_1 i_2 \ldots i_n}$ depends on several parameters, e.g. for video images, radar screens (n=2) or tomographic signal analysis (n=3), Wiener filtering is reduced to multivariate system of Wiener-Hopf equations which requires n-D MSF.

Application to Wavelet Compression

Wavelet compression is a form of data compression using the so-called wavelet transform. It is often employed for compression or coding of structured information, e.g. for compression of image, video or audio signals. The goal is to store the data in as little space as possible. Performing the wavelet transform and removing the coefficients that are outside a theoretical threshold shrinks the existing data performing a lossy compression. Such information is more suitable for storage and transmission. When the inverse wavelet transform is performed, information can be reconstructed without producing significant distortion, if the removed coefficients for this compression are appropriately selected. If the considered data depends on several parameters, then multivariable wavelets are involved in the process instead of usual wavelets.

A challenge in every specific practical problem of wavelet compression is to select how to remove the superfluous coefficients. One important factor in this system is the way one decides which information is "less important" and should be discarded. The short list of known multivariable wavelets restricts the area of applications of the compression method described above.

An exemplary implementation of the present invention may provide a complete classification of a new rich class of multivariable wavelets. The computational procedures for construction of such wavelets is described in Step 4 of Procedure 2. Having quick access to the complete bank of such multivariable wavelets, opens the possibility of choosing the best possible selection, thereby maximizing the compression level for a given level of accuracy in signal reconstruction.

Figure 1:
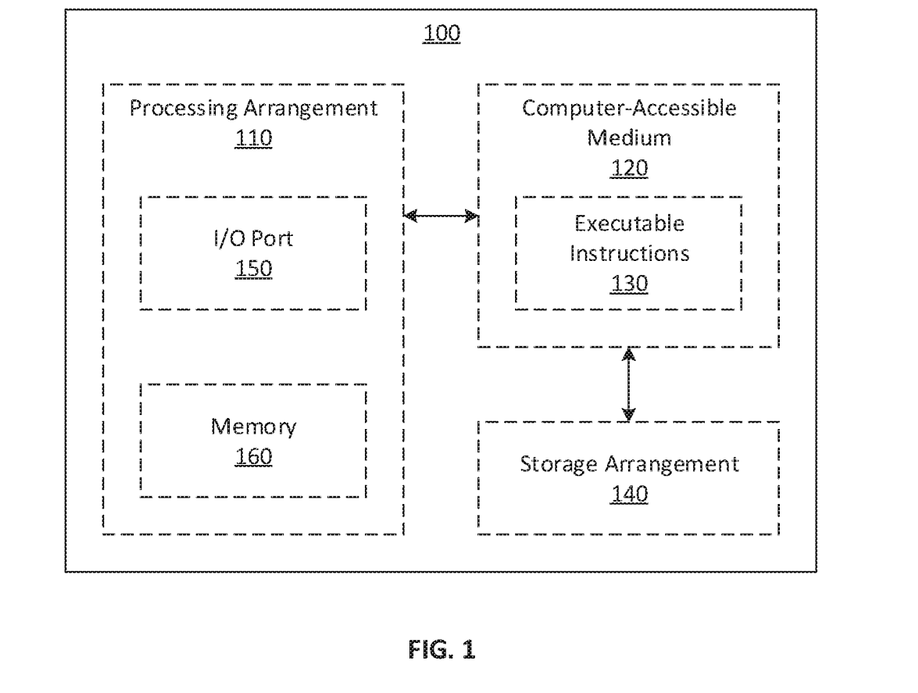
FIG. 1 illustrates a computer system for use with certain implementations.

As shown in FIG. 1, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Example Implementations

Figure 2:
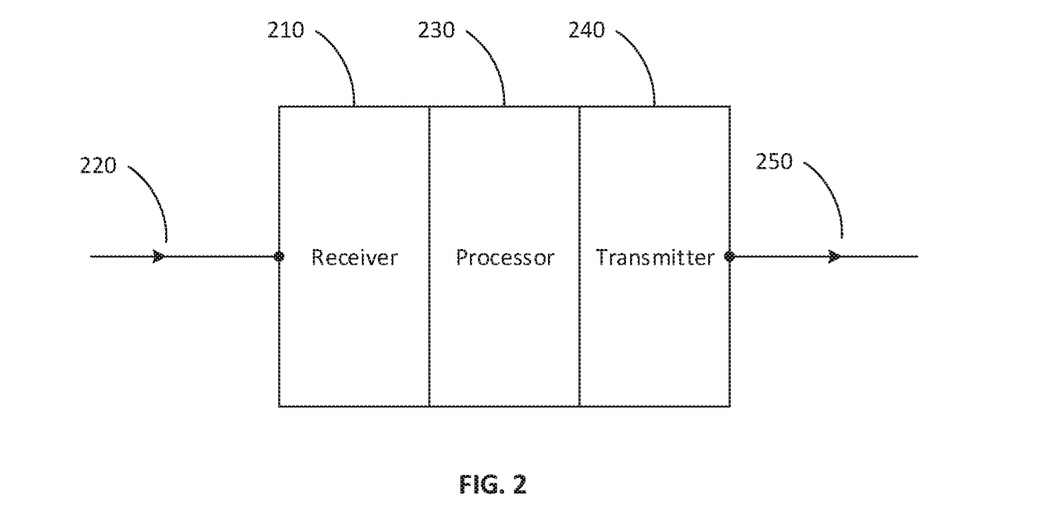
FIG. 2 illustrates a device according to an example implementation.

An exemplary implementation of the present invention may be an apparatus, such as a computer device, illustrated in FIG. 2. The apparatus may include a receiver 210 configured to receive a signal input 220 whose characteristics may be described by means of a high-dimensional matrix with multivariable high-order polynomial or non-rational entries. This can be expressed, for example, as being that the receiver 210 is configured to receive a signal input describable with a high-dimensional matrix with high-order polynomial or non-rational entries. When it is said that the signal is so describable, it should be understood that it is intended that the signal cannot be characterized more simply. One of ordinary skill in the art will appreciate that the characterization of signals as they occur in wireless communications may be characterized according to this description. Other signals are, of course, not excluded.

The apparatus may also include a processor 230 configured for estimating a message from the received signal using a filtering technique. A person of ordinary skill in the art would appreciate that many filtering techniques may be applicable to the problem at hand, namely estimating a message from a received signal. The filtering, may in some implementations employ the method of n-D Matrix Factorization described earlier. The processor 230 may be the same physical device as the receiver 210, or the receiver 210 and the processor 230 may be separate physical devices. For example, in some implementations, the processor 230 may be a general purpose processor and the receiver 210 is an input port for the processor. In another example, both the processor 230 and receiver 210 are the same application specific integrated circuit. These examples are not meant to be limiting. The processor 230 may be specifically configured to perform matrix calculations and may be provided with suitable logic circuitry and software programming to accomplish matrix mathematics and manipulations described throughout this patent application.

The apparatus can further include a transmitter 240 configured to provide a real-time output 250 of the filtering. The transmitter 240, like the receiver 210, can be implemented either as a discrete physical element or as an integrated component with either or both of the receiver 210 and the processor 230.

Although the above apparatus has been characterized in terms of performing filtering implementations, one of ordinary skill in the art would appreciate that suitable modifications to the above apparatus could be made to configure the processor 230 to perform data compression such as wavelet compression.

The signal input 220 may, in some implementations, be a noisy signal of a wireless communication system (not shown). The output signal from the output 250 can be a repaired version of the received signal from which noise has been removed. In some implementations, output 250 is a real-time output.

Figure 3:
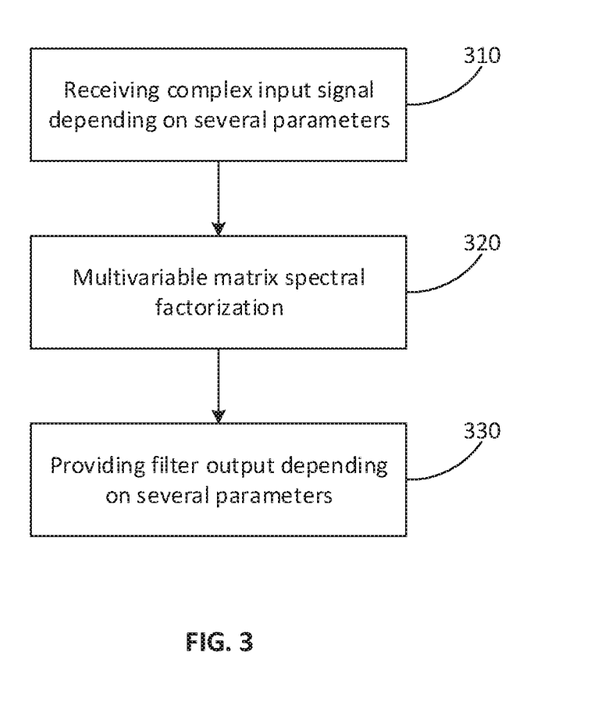
FIG. 3 illustrates a method according to an example implementation.

FIG. 3 illustrates a method according to an example implementation. The method may include receiving 310 a complex signal input depending on several parameters whose characteristics may be described by means of a high-dimensional matrix with multivariable high-order polynomial or non-rational entries. The filtering may employ 320 multivariable matrix spectral factorization. The method may further include providing 330 a filter output depending on several parameters.

The signal input can be, for example, a noisy signal of a wireless communication system. The output signal can be, for example, a repaired version of the received signal from which noise has been removed. Thus, the method can provide a concrete and tangible output signal. The method can be implemented in such a way that each step of the method is performed by a computing device. Thus, one implementation of the present invention is a non-transitory computer-readable medium (such as a recording or storage medium) encoded with instructions that, when executed on a computing device perform the method.

Figure 4:
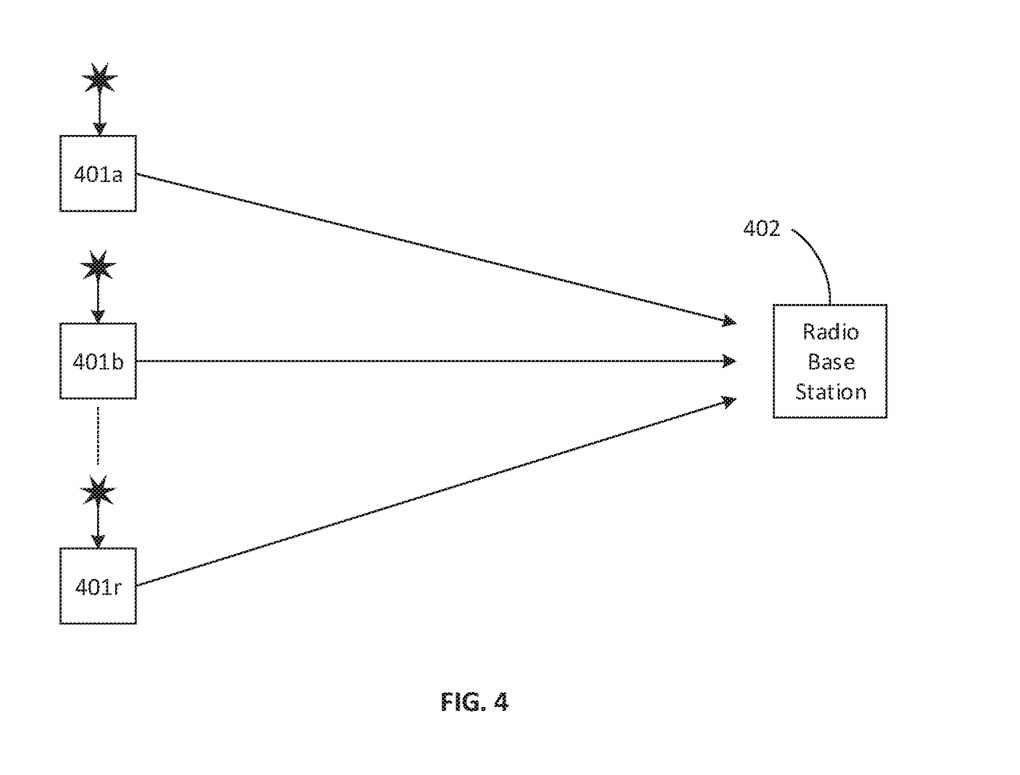
FIG. 4 illustrates a system according to an example implementation.

Another exemplary implementation of the present invention is a method for estimating a message from a received signal at a receiver. For example, multiple mobile units 401 (i.e. 401 a, 401 b . . . 401 r) could send messages to a base station as seen in FIG. 4. The messages from the received signals need to be estimated simultaneously.

Figure 5:
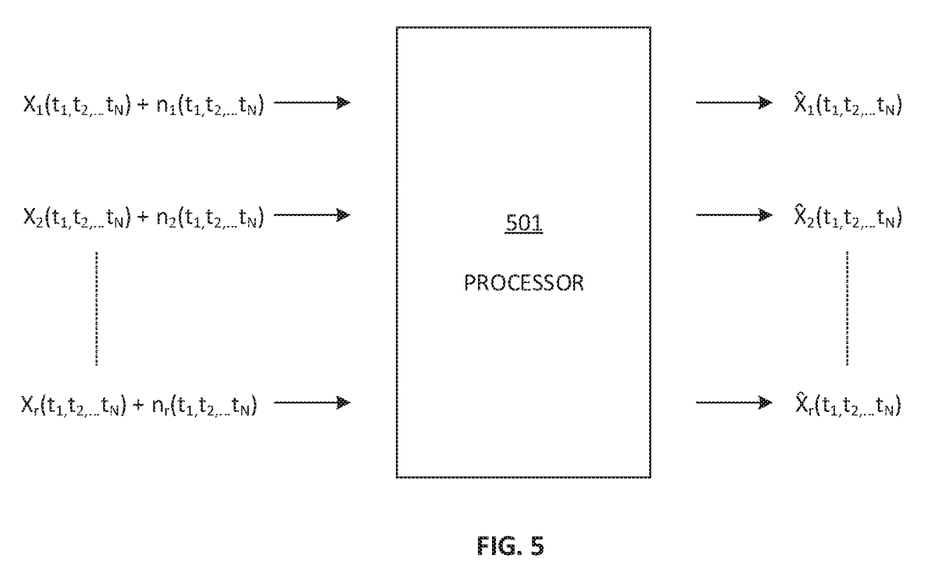
FIG. 5 illustrates an apparatus according to an example implementation.

FIG. 5 is an example implementation that provides for a logic unit such as a processor that takes a noisy signal as an input and provides for an estimate of the message included in the noisy signal. The processor may employ filtering along with the method of multivariable matrix spectral factorization described earlier. The processor may apply other filtering techniques that are computationally reducible to a state where the method of multivariable matrix spectral factorization yields spectral factors, which are used in construction of the filter.

Figure 6:
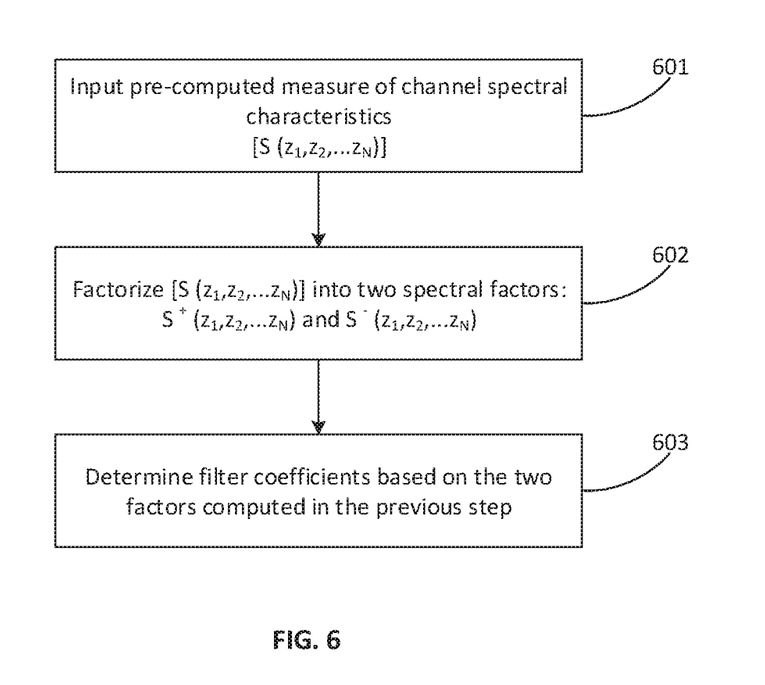
FIG. 6 illustrates a method according to an example implementation.

FIG. 6 is another example implementation of the present invention. This implementation provides for a method of determining coefficients for a filter that will allow for estimating a message from a noisy input signal. In this method, 601 a pre-computed measure of the channel characteristics (which is in the form of a multivariable spectral density matrix function), is factorized 602 into two spectral factors. In 603 the filter coefficients (which describe the impulse response of the filter) are determined from the spectral factors determined in 602. The precomputed measurements such as the spectral characteristics of the signal are assumed known. In practice they are computed ahead of time based on signal characteristics and channel qualities or by monitoring the source (at the source). For example, the source in may be monitored, the characteristics then computed, and then separately communicated to the receiver in order to calibrate the filter correctly. Nonetheless there may be cases where the signal characteristics are not precomputable and have to be estimated "on-line."

Figure 7:
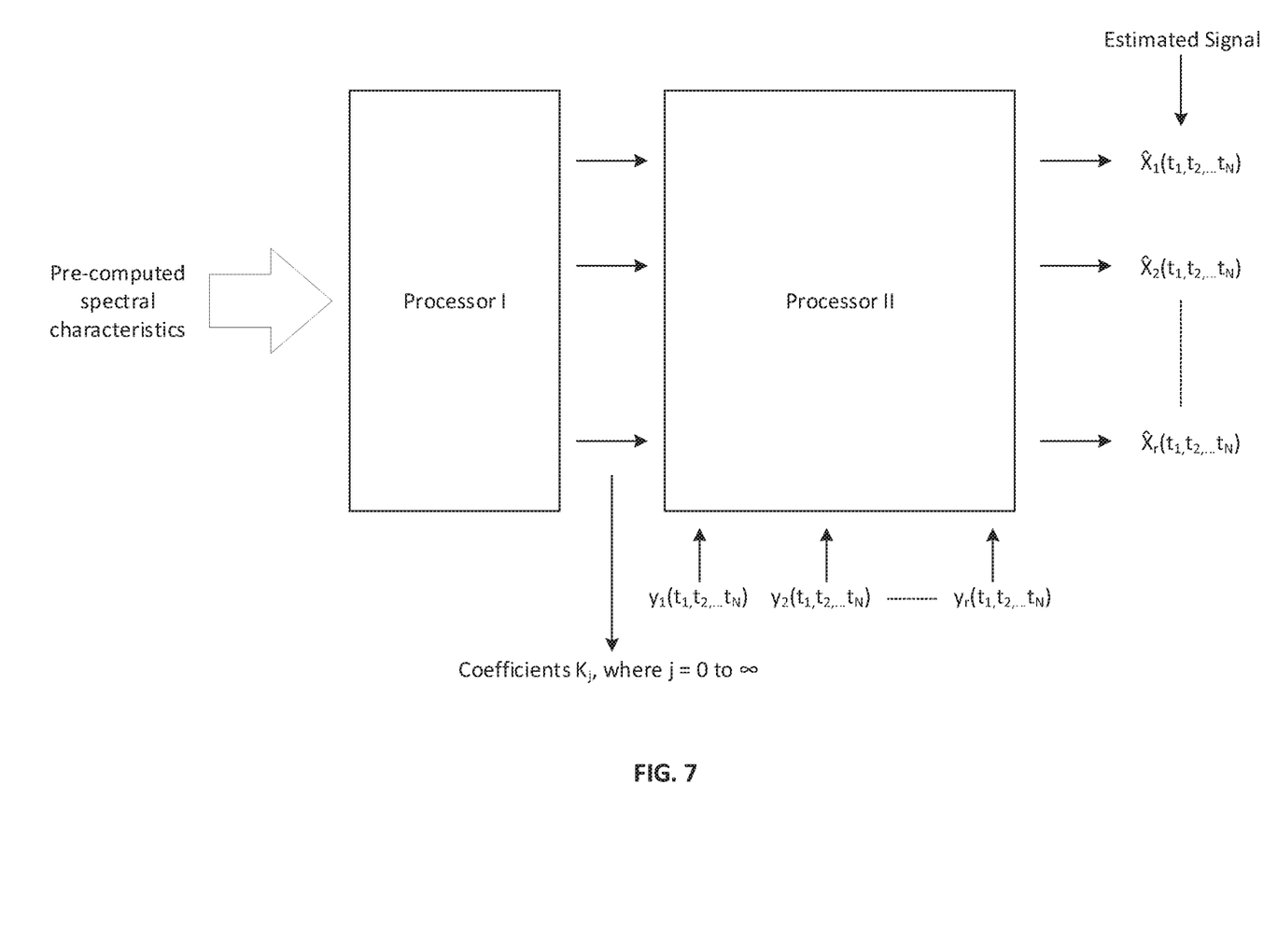
FIG. 7 illustrates an apparatus according to an example implementation.

FIG. 7 describes the processor 501 in FIG. 5 in greater detail. It must be noted that the two processors in FIG. 7 may be the same integrated circuit or logic component or may be different integrated circuits or logic components. Specifically, processor 1 may compute the filter coefficients based on the precomputed spectral characteristics of the channel and/or the incoming signal. The processor 1 may include logic components for receiving the precomputed spectral characteristics, which may be described by a means of a high-dimensional matrix with multivariable high-order polynomial or non-rational entries. Processor 1 may also include logic components for computing canonical spectral factors of the received characteristics. Processor 1 may further include logic components for computing filter coefficients using the computed canonical spectral factors. In FIG. 7, the processor 2 may be further decomposed into additional logic components, which perform functions such as taking N samples of the incoming signal $y_i$. These samples would then be output to another logic block within processor 2 that would compute the estimated signal or message based on coefficients of the filter computed by processor 1 and the original input signal $y_i$.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer system comprising
a receiver for receiving multidimensional information;
one or more processors; and
a non-transitory computer-readable medium operatively connected to the one or more processors and including computer code configured to:
  receive a signal input based upon n parameters, where n is greater than 1;
  apply n-D Matrix Spectral Factorization to the received signal input; and
  transmit an output of the n-D Matrix Spectral Factorization; and
  wherein the n-D Matrix Spectral Factorization is a multivariable matrix spectral factorization comprising:
    performing, for a given multivariable matrix spectral density, a lower-upper triangular factorization to factor the given multivariable matrix spectral density into a first matrix and a conjugate transpose of the first matrix, and
    recurrently processing the first matrix by preparing an auxiliary matrix considering a submatrix of the first matrix, expanding auxiliary entries of the auxiliary matrix into series with general coefficients, cutting the tails, constructing multivariable wavelet matrices, and increasing a dimension of the considered submatrix, and
    applying a canonical spectral factor to a result of the recurrent processing of the first matrix.

2. The system of claim 1, wherein the signal input is a complex signal input depending on several parameters.

3. The system of claim 1, wherein the signal input is a noisy signal of a wireless communication system.

4. The system of claim 1, wherein the output signal is a repaired version of the received signal from which noise has been removed.

5. The system of claim 1, wherein the multivariable matrix spectral factorization performs n-variable multidimensional filtering on the signal input.

6. The system of claim 1, wherein the multivariable matrix spectral factorization performs image or video compression on the signal input.

7. The system of claim 1, wherein the multivariable matrix spectral factorization is utilized with the multiparameter Granger causality test.

8. An apparatus, comprising:
receiving means for receiving a signal input based upon n parameters, where n is greater than 1;
processing means for applying n-D Matrix Factorization to the received signal input; and
transmitting means for providing a signal output of the n-D Matrix Spectral Factorization; and
wherein the n-D Matrix Spectral Factorization is a multivariable matrix spectral factorization comprising:
performing, for a given multivariable matrix spectral density, a lower-upper triangular factorization to factor the given multivariable matrix spectral density into a first matrix and a conjugate transpose of the first matrix, and
recurrently processing the first matrix by preparing an auxiliary matrix considering a submatrix of the first matrix, expanding auxiliary entries of the auxiliary matrix into series with general coefficients, cutting the tails, constructing multivariable wavelet matrices, and increasing a dimension of the considered submatrix, and
applying a canonical spectral factor to a result of the recurrent processing of the first matrix.

9. The apparatus of claim 8, wherein the signal input is a noisy signal of a wireless communication system.

10. The apparatus of claim 8, wherein the signal input is a complex signal input depending on several parameters.

11. The apparatus of claim 8, wherein the output signal is a repaired version of the received signal from which noise has been removed.

12. The apparatus of claim 8, wherein the multivariable matrix spectral factorization performs n-variable multidimensional filtering on the signal input.

13. The apparatus of claim 8, wherein the multivariable matrix spectral factorization performs image or video compression on the signal input.

14. The apparatus of claim 8, wherein the multivariable matrix spectral factorization is utilized with the multiparameter Granger causality test.

15. A method executing on one or more processors, comprising:
receiving a signal input based upon n parameters, where n is greater than 1;
applying n-D Matrix Spectral Factorization to the received signal input by:
performing, for a given multivariable matrix spectral density, a lower-upper triangular factorization to factor the given multivariable matrix spectral density into a first matrix and a conjugate transpose of the first matrix,
recurrently processing the first matrix by preparing an auxiliary matrix considering a submatrix of the first matrix, expanding auxiliary entries into series with general coefficients, cutting the tails, constructing multivariable wavelet matrices, and increasing a dimension of the considered submatrix, and
applying a canonical spectral factor to a result of the recurrent processing of the first matrix; and
transmitting an output of the n-D Matrix Spectral Factorization.

16. The method of claim 15, wherein the signal input is a noisy signal of a wireless communication system.

17. The method of claim 15, wherein the signal input is a complex signal input depending on several parameters.

18. The method of claim 15, wherein the output signal is a repaired version of the received signal from which noise has been removed.

19. The method of claim 15, wherein the multivariable matrix spectral factorization performs n-variable multidimensional filtering on the signal input.

20. The method of claim 15, wherein the multivariable matrix spectral factorization performs image or video compression on the signal input.

* * * * *